Nov. 10, 1931.  J. H. LIEBER  1,830,843
STOVE
Filed Jan. 11, 1930
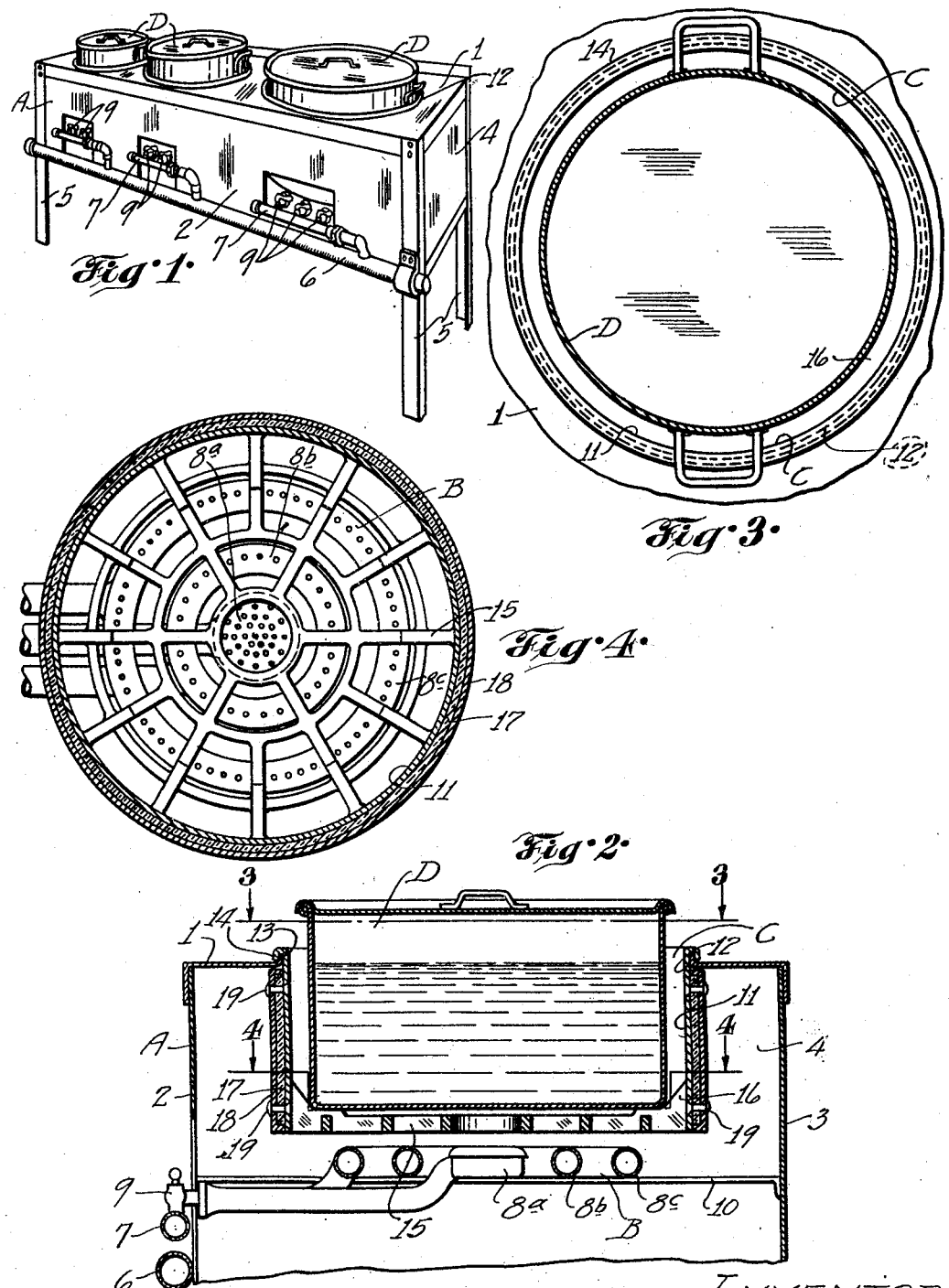
INVENTOR
James Henry Lieber Patented Nov. 10, 1931

1,830,843

UNITED STATES PATENT OFFICE

JAMES HENRY LIEBER, OF ST. LOUIS, MISSOURI

STOVE

Application filed January 11, 1930. Serial No. 420,079.

This invention relates generally to stoves and has particular reference to a so-called cooking table, wherein cooking utensils or vessels are set into an enclosure opening through the top of the tables.

The invention has for its principal objects to provide a cooking table adapted for use with a combustion device, as a gas burner or the like; to provide a cooking table adapted for use with a heating device in which heat is reflected to the sides of the contained cooking vessel; to provide a heat-insulated enclosure around such contained vessel for heat-retaining purposes; and in general to improve the construction and utility of cooking vessels—all as will more particularly hereinafter appear.

And with the above and other objects in view, the invention resides in the novel features of form, construction, arrangement and combination of parts hereinafter described and pointed out in the claims.

In the accompanying drawings:

Figure 1 is a perspective view of a stove or cooking table embodying the preferred form of my invention;

Figure 2 is a vertical fragmentary cross-sectional view through one of the utensil receiving enclosures of Figure 1, showing a contained utensil, the combustion device thereunder, and a part of the housing therearound;

Figure 3 is a fragmentary top plan view along the line 3—3 of Figure 2, the contained cooking utensil being shown in section; and Figure 4 is a horizontal sectional view through the utensil enclosure along the line 4—4 of Figure 2, showing the grating means for supporting a utensil in heat-receptive relation to the combustion device, the utensil being removed.

Referring now more particularly to the drawings, which illustrate a preferred embodiment of the invention, the stove or so-called cooking-table preferably includes a burner-box or housing A, having a top-closure 1, front and back or side closures 2, 3, and end closures 4, 4. At this time it may be said that the burner box A may be an integral part of a stove, or it may be a separate unit to be set on a stove, or, as in the preferred embodiment, the housing A may be supported by floor-engaging members or legs 5, 5, which in the present instance are extensions of the corner angle-members of the housing. Mounted in the burner-box are a plurality of heating devices B, each preferably comprising a fuel combustion means as a gas burner or the like, and for such purposes there is provided across the front of the housing A a suitably supported gas-supply pipe or so-called manifold 6, from which there lead suitable header-pipes 7, 7, each supplying gas to the respective burners B. In such regard it may be pointed out that one of the burners B is composed of three separately controlled annularly arranged ring-burner units 8a, 8b, 8c, controlled by three valves 9, 9, 9, while the other burners may have but two such burner units, controlled by two valves 9, 9, as shown in Figure 1. Preferably the burners are each supported on a suitable cross-member 10. (Fig. 2.)

Opening through the top wall 1 of the housing A is a utensil receiving open-ended chamber C, depending interiorly the burner-box A and formed by a preferably annular wall or utensil enclosure 11, extending through an aperture 12 (Fig. 1) in the top wall, this aperture being made to receive the chamber C, and in such regard the opening 12 in the top-closure 1 is preferably upstandingly flanged as at 13, the top margin of the wall 11 being supportingly crimped over the flange 13, as shown at 14, Figure 2, and in such wise providing a table-like appearance to the top wall of the housing A, although it will be understood that the chamber C may project more or less above the top wall 1 of the housing, and may be loosely removably supported thereupon, if desired.

Preferably, though not necessarily, attached to the lower margin of the wall 11 is a utensil supporting grating or grid 15, best seen in Figure 4, and in such respect it may be pointed out that preferably the enclosure 11 is upstandingly disposed over and in heat-receptive relation with the burner B for ascensional passage of the gases of combustion from the burner through the grid 15 and chamber C. In such regard, if a suitable cooking vessel or utensil D be disposed within the chamber C in heat-receptive relation to the hot-gases supplied to its underside, as from the burner B, such gases will, of course, laterally escape from under the utensil D and impinge the enclosing wall 11 for deflecting said gases upon the sides of the vessel D. For such purposes the vessel D is preferably spaced from the wall 11 so as to leave an annular flue-like or gas-confining channel 16 between the walls of the vessel D and the walls of the enclosing chamber C, as best seen in Figures 2 and 3.

In such respect the wall 11 is composed of any suitable heat-reflecting or radiating material, which in the present instance comprises a metallic member adapted to absorb heat from the hot gases and reflect or radiate the same on the walls of the vessel D, and, in order to prevent the loss of heat outwardly from the wall 11, the same is preferably insulated for heat-retaining purposes as by a suitable conjoined wall of insulating material 17, which preferably is retained or supported around the chamber C by a channel-shaped annular member or casing 18 suitably fastened as by elements 19 to the walls 11.

As shown, the vessel D is removably supported on the grid 15 in the chamber C, but it is to be understood that other means may be employed for such purposes, and likewise that the chamber C may be integrally united or otherwise form a part of the vessel D in such wise that a unitary structure may be provided for setting on an ordinary stove, which latter, it will be understood, may in such regard be a gas, wood or coal stove, or may be of the electrical type, as may best serve the purposes intended.

While the use of the invention has been pointed out as the description has proceeded, it may be said that the same is particularly adapted for restaurant and hospital use in cooking large quantities of food in an economical manner, and also to take the place of steam tables, and further for use in hospitals for sterilizing purposes, or for cooking purposes in homes and in general, wherever heat-transference is to be accomplished in a highly efficient, economical and practical manner.

It is to be understood that changes and modifications in the form, construction, arrangement and combination of the several parts of the device may be made and substituted for those herein shown and described, without departing from the nature and principle of the invention.

Having thus described my invention, what I claim and desire to secure by Letters Patent is:

1. In a stove, the combination, with a heating device and a housing therefor, of a top closure for said housing having a vessel receiving opening surrounded by an upstanding annular flange, and a vessel enclosing annular wall depending through said opening the upper margin of said wall being supportingly crimped over said annular flange.

2. A gas stove including in combination a top plate having an opening surrounded by an up-standing annular flange, an annular wall depending in said opening for attachment of its upper margin to said annular flange, and means attached to the depending portion of said annular wall for supporting insulation material therearound.

In testimony whereof, I have signed my name to this specification.

JAMES HENRY LIEBER.